Aug. 2, 1938.                P. SCHLUMBOHM                    2,125,319
                        METHOD OF ILLUMINATING ROOMS
                             Filed Aug. 13, 1935
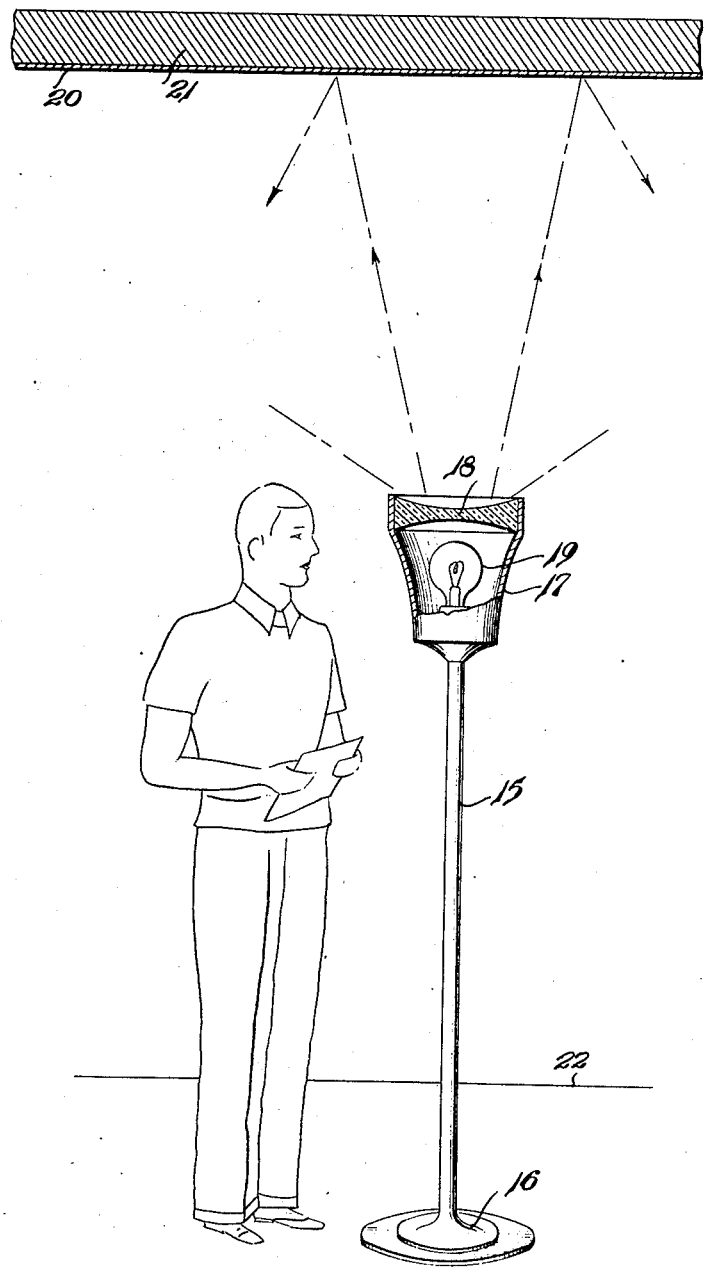
Inventor Patented Aug. 2, 1938

2,125,319

UNITED STATES PATENT OFFICE 2,125,319

METHOD OF ILLUMINATING ROOMS

Peter Schlumbohm, Paris, France

Application August 13, 1935, Serial No. 35,929
In Germany August 14, 1934

4 Claims. (Cl. 240—1.1)

The invention relates to the artificial illumination of rooms and is aiming at the special task of illuminating a room with artificial daylight of diffused character. Moreover, any light of a desired spectral composition may be created for the illumination of rooms by means of the technical rules as disclosed by this invention.

The invention is illustrated by way of example, diagrammatically, partly in section and partly in view in the accompanying drawing. In this drawing a lamp 15 is standing with its base 16 on the floor 22 of a room the ceiling of which is indicated by part 21. The sketch of a human figure is to indicate the proportions of the lamp and its level in the room, the ceiling of which is equipped in a special way. As near to the ceiling as possible there is a color-filter mirrored reflector 20. The globe 19 of the lamp is screened off against the eye of the man standing next to the lamp by the screen 17, which is polished inside to work as a reflector. Between the globe 19 and the color-filter mirror 20, a divergent lens 18 is provided. Thus the light of the globe 19 is thrown as a widely divergent beam against a large surface of the color-filter mirror. The lens 18 has two effects: first, to avoid a strong and disturbing image of the globe 19 in the mirror 20; second, to produce a practically equal intensity of light at the whole surface of the mirror 20. Projecting the light in a divergent beam against a large surface of the color-filter mirror makes it possible to use very weak filters for the color-filter mirror 20, thus diminishing the loss of light by absorption to a minimum. There are many ways, known in the art, of producing a divergent beam of light; the technical means of a biconcave lens as illustrated in the drawing, is only one of such means and other means may be applied as well.

I am aware of the fact that it has been proposed to illuminate a room with colored light by painting the ceiling with the desired color and by projecting light against those painted walls of the ceiling for the purpose of illuminating the room with the light as reflected from the painted ceiling. This old method has the disadvantage that the loss of light by absorption is very great; furthermore, that a painted wall does not constitute a very precise technical means for obtaining certain precise color effects and finally, that painted surfaces are inclined to fade and to change the color. The new technical means as chosen in this invention are clearly advantageous in all these points. The loss of light by absorption is extremely small, the filter can be made with utmost precision and such a filter will remain constant in its optical effect.

A color-filter mirrored reflector as applied in this invention may be constituted by a plate of tinted glass which is mirrored at the back, or by a plate of colorless glass which is covered at the back with a tinted layer of colored metal, like copper, or by a laminated glass which is mirrored at the back and which is combined with a tinted transparent organic foil.

I do not claim the use of normal colorless mirrors as reflecting surfaces of the ceiling of a room in connection with a lamp which throws light against this mirror at the ceiling. The invention is restricted to the use of color-filter mirrors as reflecting surfaces in the upper part of the room in connection with lamps which throw light against those color-filter mirrors.

The invention is of special value for illuminating a room with diffused artificial daylight. This is a great problem in factories where artificial daylight would improve working conditions and in department stores where materials shall be judged as to their daylight appearance.

The daylight illumination effect is obtained by using a normal incandescent lamp 19 with its yellowish light and by using a mirrored plate glass of bluish tint for the mirrored reflector 20. Following the invention a very light bluish tint is chosen and the bluish coloring matter in the glass is of a very small percentage. I found that a suitable daylight glass for the reflector can be made by adding to a standard ground glass composition the small amount of 0.01% or even less of cobalt oxide as coloring matter for obtaining the bluish color. Such a bluish plate glass, mirrored at the back, will have the suitable properties for the purpose set forth.

Having now described my invention and the manner in which it may be performed, which may be varied within a fair scope, what I claim is:

1. In a room, means for illuminating the room, said means comprising a color-filter mirrored reflector arranged near the ceiling of the room and an artificial source of light provided with means to project a widely divergent beam of light against said reflector, the direct light rays from the source of light being substantially limited to the upper portion of the room, and said reflector covering a sufficient portion of the ceiling whereby the reflected light substantially illuminates the room.

2. Means for illuminating a room as recited in claim 1, in which the light source is an incandescent lamp and the color-filter is blue whereby the room is illuminated with light which approximates daylight.

3. Means for illuminating a room as recited in claim 1, in which the light source is an incandescent lamp and the color-filter mirror comprises a mirrored blue glass plate having not more than 0.01% of cobalt oxide as the coloring matter for the blue color in the glass.

4. In a room, means for illuminating the room, said means comprising a color-filter mirrored reflector on the ceiling of the room and covering substantially the entire ceiling and an artificial source of light provided with means to project a widely divergent beam of light against said reflector, the light rays from the source of light being substantially limited to the upper portion of the room, whereby the room is illuminated by light filtered and reflected by said reflector.

PETER SCHLUMBOHM.